May 27, 1969

A. E. MORRIS, JR 3,446,289

REVERSIBLE PITCH PROPELLER CONTROL SYSTEM

Filed Feb. 8, 1967

INVENTOR
Albert E. Morris, Jr.
BY
Wofford & Felsman
ATTORNEYS

LANDING APPROACH COMPARISON

Fig. 14

United States Patent Office 3,446,289
Patented May 27, 1969

3,446,289
**REVERSIBLE PITCH PROPELLER
CONTROL SYSTEM**
Albert Earl Morris, Jr., 3244 Childress, Fort Worth, Tex.
76118; Helen Knox Morris, executrix of said Albert
Earl Morris, deceased
Filed Feb. 8, 1967, Ser. No. 614,586
Int. Cl. B64c 11/40, 27/64, 27/66
U.S. Cl. 170—160.2                                   15 Claims

ABSTRACT OF THE DISCLOSURE

Disclosed herein is a variable pitch propeller control system which utilizes a hydraulically actuated propeller assembly and control system of the type disclosed in Biermann's U.S. Patent No. 3,249,159. I have improved this system to enable safe application even to small aircraft by providing an upper positive pitch stop at the normal maximum pitch for the propellers, along with control linkage improvements that prevent interference with governor control of the porpeller blade pitch so long as the pitch is in a selected upper positive pitch range. Downward movement of the propeller pitch control handle when the propeller blades are in the above positive pitch range tends to further open the propeller pitch control valve, which is already partially open, thus preventing interference with governor control. Upward movement of the control handle is prevented by a positioner means or mechanical stop, thereby prohibiting control valve movement in the opposite or closed direction. The pitch control and the throttle are interconnected in one embodiment to program predetermined motions between them to eliminate necessity for operating simultaneously the throttle and the pitch control handle in many instances. Also, a governor by-pass valve is provided in one embodiment to enable rapid governor control override but only when the propeller pitch is in a range below the above described upper positive pitch range. I also disclose control means for utilizing an intermediate pitch range and a method that further insures safe utilization of the system on small single engine aircraft.

---

Reversible pitch propellers have ben used extensively in the aircraft industry. They have been, for example, used effectively in military and commercial aircraft, having been particularly successful in recent years in aircraft powered by turboprop engines. When combined with turboprop engines, the pilot commonly may freely move the propeller blades between positive and negative pitches, with governor devices being utilized to prevent excessive and damaging propeller speeds. The controls utilized in such instances have not been successfully applied to non-commercial airplanes powered by reciprocating engines for a number of reasons, including weight, safety, complexity, and cost considerations.

The propeller control system suggested by Biermann in U.S. Patent No. 3,249,159 appears to offer significant advantages over other known systems, but here too, the pilot is given opportunity to shift at will the propeller pitch to maximum positive pitch (completely to the feathered position if desired). It is regarded essential in the interest of safety that the pilot of a small airplane be prevented from altering the propeller pitch indiscriminately or in any way interfering with normal governor control, as when taking-off or cruising for example, for in such instances deviation from governor directed propeller pitches can be extremely hazardous.

It is accordingly the general object of my invention to provide an improved reversible pitch propeller control system to enable the propeller blades especially of small, lightweight aircraft (usually referred to as general aviation aircraft) to be moved safely between positive and negative pitches.

The following reversible pitch propeller control system utilizes the basic system disclosed by Biermann (3,249,-159) in which a governor senses changes in propeller loading and automatically varies the pitch of the propeller blades to maintain propeller speed below a selected governed speed. I have discovered that during such instances it is essential that the propeller pitch reversing system be automatically inactivated so as not to interfere with the relationship between the governor and the propeller blade.

It is, therefore, another object of my invention to provide an improved reversible pitch propeller control system which is inactivated so long as the propeller blades are in a selected upper positive pitch range and operating as governed speeds.

A propeller pitch control system finds one application before the aircraft touches the ground during the landing approach. During landing approaches, I have discovered that effective braking control is established by moving the propeller blades in an intermediate pitch range which is below the pitch range in which the governor automatically controls the propeller pitch, but which is above the minimum, negative pitch of the propeller blades. A control system by which the propeller blades are reversed to very low, negative values can cause a rate of descent too fast for safe utilization in the hands of all but a few of the most experienced pilots. Therefore, it is advantageous that the control system have means which enables the pilot to conveniently vary the pitch only in an intermediate reference range.

It is thus another object of my invention to provide in a reversible pitch propeller control system control means which establish an intermediate reference range through which the propeller pitch is varied during landing approaches.

Another object of my invention is to provide an improved landing method.

Another object of my invention is to provide in a reversible pitch propeller control system by-pass means to enable rapid and positive propeller blade movement toward maximum negative pitch by overriding the governor control even when the propeller is operating under governor control but below a selected positive pitch range, as when touching down for a landing.

It is another object of my invention to provide in a reversible pitch propeller control system a throttle override which correlates propeller pitch and engine speed during the intermediate and reverse pitch range.

Another object of my invention is to provide in a reversible pitch propeller conrtol system a throttle override which programs selected nonlinear relationships between propeller pitch and engine speed during the intermediate and reverse pitch range.

These and other objects are effected by my invention as will be apparent from the following description taken in accordance with the accompanying drawings, forming a part of this application, in which:

FIG. 1–A is a combination fragmentary perspective and side elevational view, partially in section, showing a reversible pitch propeller control system in combination with control linkage means constructed in accordance with the principles of my invention.

FIG. 1–B is a side elevational view, partially in section, of the linkage adjustment means shown in FIG. 1–A.

FIGS. 7–A through 7–B illustrates a modified form of pitch control handle that engages the throttle override control rod in a manner to effectively program selected throttle settings during movements of the control handle;

FIGS. 10–A and 10–B are schematic views of other forms of throttle override linkages;

With reference to the drawings, the letter A designates a propeller assembly connected with a control linkage B, a pitch control valve C, and a governor means D which includes a pump for forcing oil into the propeller assembly from an engine oil reserve E to vary the pitch of the propeller blades.

The propeller assembly A includes propeller blades 11 mounted for rotation about longitudinal axes defined by support shafts 13 carried by the body 15 of the assembly. The fluid responsive element F is in this instance a tubular cap supported by a hollow nipple 17 that reciprocates to define a variable volume fluid chamber 19. Fluid is received or discharged from this chamber through a passageway 21 that extends through the body 15. Suitable seals 23 are utilized between the mating surfaces of the hollow nipple 17 and the fluid responsive element F.

Figure 1:
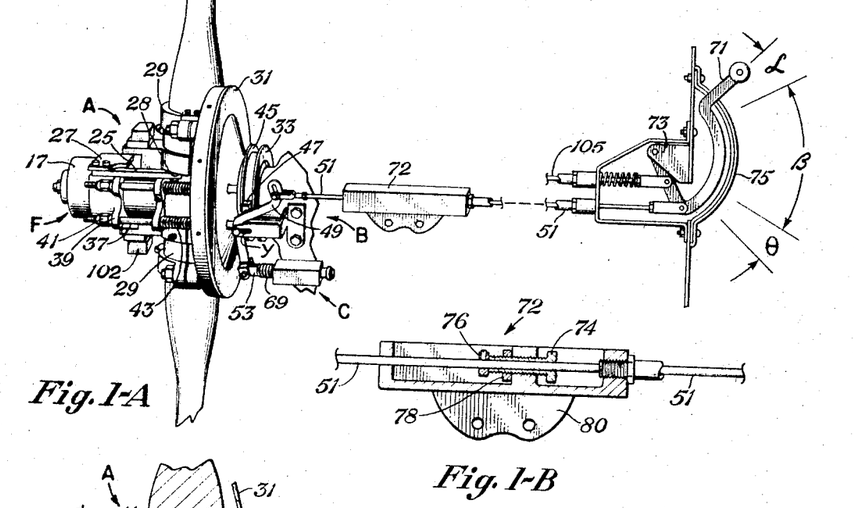
Figures 2, 3, 4:
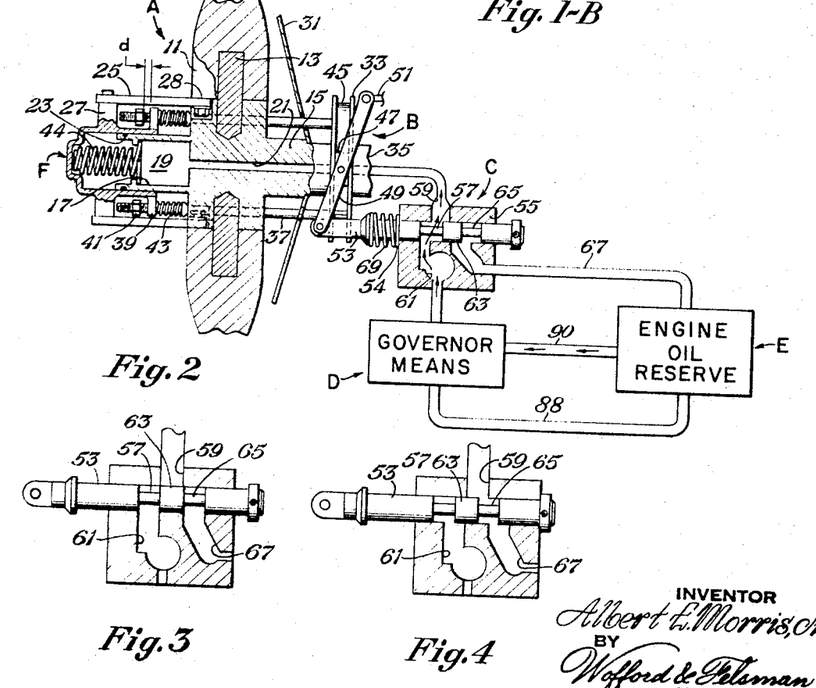
FIG. 2 is a schematic side elevational view, partially in section, of a portion of the apparatus shown in FIG. 1, including a diagram of a preferred hydraulic circuit.
FIGS. 3 and 4 illustrate the valve shown in the hydraulic circuit of FIG. 2, with its valve element shown in two different positions.

Linear movements of the fluid responsive element F are translated into rotation of the propeller blades 11 about their longitudinal axes by means of transmission arms 25, each of which has one end pivotally supported on a pedestal structure 27 on the fluid responsive element F and another end pivotally secured to a lower radial region 28 of an associated propeller blade. (FIG. 2 is a schematic view and hence not identical structurally with FIG. 1, as will be further seen throughout this description.) A split collar 29 (see FIG. 1) is generally utilized to retain each propeller blade to the body 15, there being a suitable bearing assembly (not shown) therein to reduce friction between the moving components.

A cover plate (not shown) may be secured to a radially extending flange 31 to the body 15 rearward of the propeller blades. Mounted rearward of the flange 31 is a translation plate 33 secured to a propeller shaft 25 (see FIG. 2) for reciprocation thereon in response to movements of control rods 37, each of which extends forward through a receiving collar 39 secured to the fluid responsive element F. Radial shoulders, provided here by nuts 41, are utilized on the extremity of each control rod. Consequently, forward movement of the fluid responsive element F with respect to body 15 causes engagement of receiving collars 39 with nuts 41 to urge the control rods and the translation plate 33 forward. When fluid pressure is relieved inside the chamber 19, fluid responsive element F moves rearward in response to the forces applied by suitable biasing means such as the large tension spring 44 located inside the fluid responsive element. Compression springs 43 are mounted around the control rods 37 to urge the translation plate toward its rearmost position.

The translation plate 33 illustrated in the drawing has an annular groove 45 formed therein to receive a follower 47, which is preferably a carbon block. The follower is pivotally secured to an intermediate portion of a rotatable arm 49 having its upper end secured to a control bar 51 and its lower end rotatably connected with an exposed end portion of a valve element 53, rearward movement of which is limited by a stop element 54.

The function of pitch control valve C is to control the flow of fluid from governor means D and also to provide an intermediate pitch control stop that establishes a pitch below which the propeller blades 11 may not rotate further toward negative pitch unless the valve element 53 is repositioned by the pilot. The valve element 53 has three positions, one of which is illustrated in the FIG. 2. In this instance the valve element is moved rearward with respect to the valve housing 55 such that its forward annular groove 57 is aligned with a passage 59 which communicates with the passageway 21 extending through the propeller body 15. When positioned in this manner, fluid may flow from the governor means D, and through passageways 61, 59 and 21 into chamber 19. Increased fluid flow and pressure urges fluid responsive element F outward. The governor means D includes a pump for circulating oil from the engine oil reserve E through the valve C when valve element 53 is positioned as shown in FIG. 2.

If the valve element 53 is moved forward slightly, its central annular body portion 63 thereof closes the connected passageways 59 and 61 (see FIG. 3), thereby locking a quantity of oil in the chamber 19 of the propeller assembly to establish a fixed position or intermediate stop of the fluid responsive element F and the propeller blades 11.

As shown in FIG. 4, further forward movement of valve element 53 moves its central annular body portion 63 to a position such that a rearward annular groove 65 now communicates with the passageway 59 leading to the fluid responsive element F. This establishes a dump position for the fluid which returns to the engine oil reserve E through a passage 67, enabling the fluid responsive element F to be drawn rearward by the previously described tension spring 44. A compression spring 69 is provided between valve element 53 and its housing 55.

By moving the valve element to the position shown in FIG. 2, the above described apparatus may be used to pump fluid from the governor means D to the fluid responsive element, thus forcing the propeller blades 11 toward a negative pitch. Or, it may be used to lock the propeller blades in an intermediate pitch by positioning the valve as shown in FIG. 3. Or, it may be used to quickly return the propeller blades to a maximum positive pitch by positioning the valve as shown in FIG. 4.

Propeller assemblies and valves of the above are described in Biermann's U.S. Patent No. 3,249,159. If utilized in accordance with my teachings and with my control means, they may be effectively and safely utilized in even small, single engine aircraft powered by reciprocating engines. As shown in FIG. 1, the control bar 51 extends rearward to a linkage adjustment means 72 utilized to establish a selected length of the control rod. Further, control rod 51 extends rearward into connection with a control handle 71 pivotally secured to a suitable support bracket 73, with its end portion extending from a slotted cockpit control console 75 such that it may be conveniently utilized by the pilot. Forward movement of control bar 51 moves valve element 53 rearward to the position shown in FIG. 1, enabling oil to flow freely between governor means D and the fluid responsive element F. The control handle 71 is adjusted and positioned such that upward movement urges control rod 51 rearward to position the valve element 53 forward.

When the engine is operating at governed speed, as during takeoff, ascent or when cruising, the valve element 53 must not interfere with the flow of fluid between the governor means D and the fluid responsive element F or otherwise the propeller pitch cannot be varied correctly to establish proper propeller loading and speed. Hence, it is essential that the fluid responsive element F have unrestricted movement while the propeller blades are in their upper positive pitch range to enable effective control by the governor means D over the propeller blade pitch while operating at governed speeds. This is accomplished by positioning the nuts 41 on the control rods 37 of the propeller assembly such that the fluid responsive element F may move a distance $d$ forward before engagement with the receiving collars 39 as taught by Biermann.

Figures 5, 6, 7, 8, 9, 10:
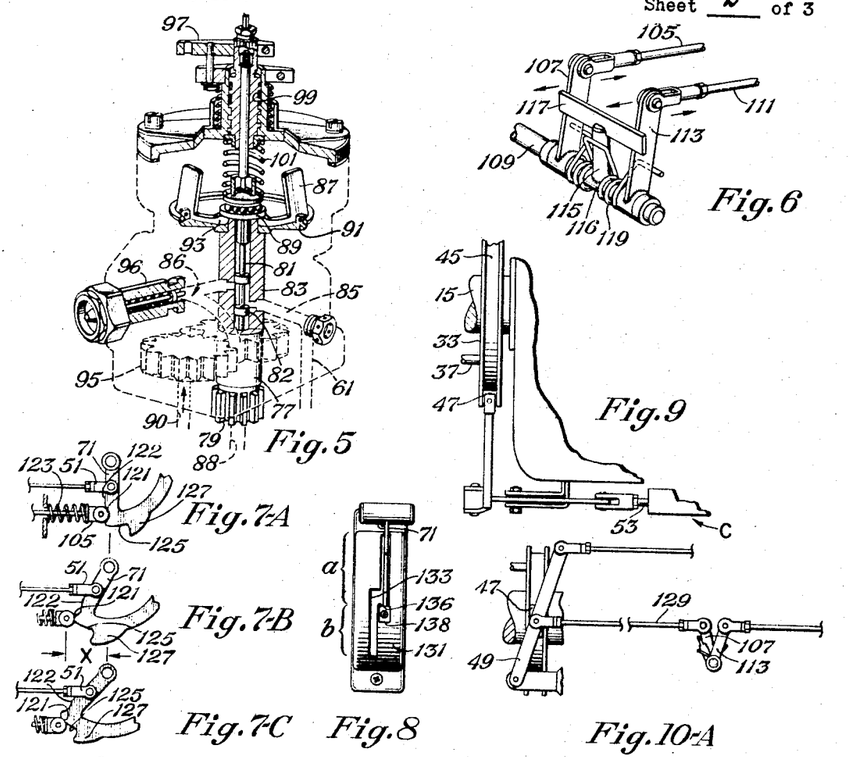
FIG. 5 is a fragmentary perspective view partially in phantom of a suitable form of governor means, which is another component of the hydraulic circuit shown in FIG. 2.
FIG. 6 illustrates a throttle override linkage used to correlate engine throttle settings with pitch control handle settings.
FIG. 8 is an end view of the control handle shown in FIG. 1.
FIG. 9 is a fragmentary plan view of a portion of the control linkage means illustrated in FIG. 1.
Figure 10:
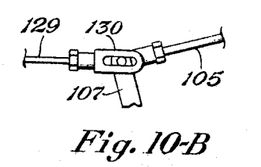

A suitable governor means as also shown by Biermann is illustrated in FIG. 5. This governor has a central rotatable shaft 77 having a geared end portion 79 which is in direct communication with the engine cam shaft (not shown) such that the shaft and the propeller rotate at identical or linearly proportional speeds. The shaft 77 has a small diameter mandrel 81 which extends axially through a sleeve 83, having a plurality of ports 85, 86 formed therein. Mandrel 81 is moved upward or downward by pivotable flyweights 87, which engage a shoulder 89 extending from the mandrel. Rotational speeds of the shaft 79 are transmitted to the flyweight through a flyweight head 91, also secured to the mandrel 81. Thus, the radial arms 93 of the flyweight are urged upward and against the shoulder 89, picking the mandrel 81 upward.

A resulting upward mandrel movement causes piston 82 to close port 85 connected with the passage 61 leading to the fluid responsive element, thus locking the fluid responsive element F in a fixed position. Slower rotational speed of the shaft 77 and the flyweights 87 conversely lowers piston 82 within the sleeve 83 such that the passage 85 is reopened to initiate flow of fluid to the fluid responsive element to pump the propeller blades toward negative pitch. A dump position is reached if the piston 82 is raised above the port 85, for this enables fluid to return from the fluid responsive element F through passages 61 and 88 to the engine oil reserve E. Consequently, the internal spring 44 of the propeller assembly urges the fluid responsive element F and propeller blades toward maximum positive pitch. The shaft 79 rotates a fluid pump 95 to cause the above described fluid flow through the hydraulic circuit. Generally, a relief valve 96 is provided downstream from the fluid pump.

If the propeller blades increase their speed, the flyweights 87 raise the piston 82 to obstruct the flow of fluid to the fluid responsive element F and eventually to the dump position, enabling the internal tension spring 44 and the flyweights 102 of the propeller assembly (see FIG. 1) to urge the blades toward a greater positive pitch to increase propeller loading and decrease propeller speed. Conversely, if the propeller blade speed decreases, the lower speed of the shaft 79 and the flyweights 87 lowers the position of the piston 82 to reconnect ports 85 and 86, thus increasing the flow of fluid to the fluid responsive element, which moves outward to decrease the propeller pitch to decrease propeller load and increase propeller speed. A speed adjusting control lever 97 is used to raise or lower a threaded stem 99, which adjusts the tension of a spring 101 and the amount of force exerted against the upper portion of the mandrel 81 to establish the speed at which the flyweights 87 may lift the mandrel.

From the above description of the governor means the reason for providing the distance $d$ between the nut 41 and the receiving collars 39 of the propeller assembly will be appreciated. The maximum positive pitch of the propeller blades is preferably established at positive 20 degrees and the distance $d$ adjusted such that the pitch may decrease to 12½ degrees before further forward motion of the fluid responsive element F causes movement of control rods 37 of the propeller assembly.

When the airplane is flying at governed speed, the valve element 53 must be maintained in the open position shown in FIG. 2. It is unsafe to permit the pilot to accidentally or intentionally reverse the pitch when taking-off, for example, since this could be expected to increase chances for a crash. When cruising, the fluid responsive element F is positioned rearward by the internal tension spring 44 (see FIG. 2) and the centrifugal weights 102 (see FIG. 1) of the propeller assembly, thereby separating the nuts 41 of the control rods 37 from the receiving collars 39 a distance $d$ as shown in FIG. 2. The compression springs 43 push the control rods rearward until the translation plate 33 reaches a predetermined axial location. With the translation plate so positioned, the control linkage B is adjusted such that the control handle 71 is in its uppermost position, as it would be when cruising or taking-off, for example. If the pilot attempts to lower the control handle 71, the control rod 51 will tend to be urged forward, the rotatable arm 49 rotated counterclockwise (as viewed in FIG. 1), and the valve element 53 will remain stationary or move rearward only slightly since it is already in its rearmost position. Thus, the propeller pitch is not affected by attempts to move the control handle 71 downward when flying at governed speeds.

The linkage adjustment means 72 of FIG. 1-B is used to help establish the correct relationship between control handle 71 and the translation plate 33. With the translation plate positioned rearward to a positive 12½ degree pitch stop, for example, the valve element 53 is manually moved to the open position shown in FIG. 2. Then the length of control bar 51 is adjusted such that control handle 71 is in its uppermost position shown in FIG. 1-A. Further upward movement is prevented by moving the adjustment screw 74 until it engages the shoulder ring 76. Then the stop nut 78 is secured, which with the shoulder ring 76 constitutes a positioner means. Consequently, control handle 71 can be moved upward no farther. The linkage adjustment means 72 has a suitable housing 80 that is rigidly attached by suitable means to preferably the engine block.

Thus, when the control handle is positioned as shown in FIG. 1, it may not be moved either upward or downward until the translation plate is moved forward by the fluid responsive element F and control rods 37 the distance $d$ to move the valve element 53 to the closed position shown in FIG. 3. Hence, governor control of the propeller pitch may not be interferred with by movement of the control handle while the propeller pitch is in the selected upper positive pitch range.

When the engine speed is decreased, the pitch of the propeller blades automatically decreases in response to governor control. This causes the fluid responsive element F to be urged toward the negative propeller pitch position. Ultimately the fluid responsive element moves the full distance $d$ until the receiving collars 39 engage the nuts 41, thus pulling the control rods and the attached translation plate 33 forward. With the control handle 71 established in its uppermost position as shown in FIG. 1, the control rod 51 maintains the upper portion of rotatable arm 49 in a fixed location. The follower 47, being attached to the rotatable arm 49, rotates the arm in a clockwise direction if moved forward by control rods 37 and fluid responsive element F, thereby pulling valve element 53 forward until it reaches the valve closed position shown in FIG. 3. This prevents interchange of fluid between the governor means and the fluid responsive element and at the same time prevents the discharge of fluid into the passage 67 to the engine oil reserve E. Thus a selected propeller pitch is established. The control linkage and the valve element are used, therefore, as an intermediate pitch control stop means that establishes an intermediate positive pitch somewhere above the minimum negative pitch, which is, for example, about minus 14 degrees. Good results are obtained in small single engine aircraft by adjusting the distance $d$ such that the valve is moved to the valve closed position and to its intermediate stop position when the propeller pitch is plus 12½ degrees.

With the propeller pitch established at 12½ degrees by the intermediate pitch control stop means, the pitch will not vary toward positive unless the throttle is opened, at which time the rotating masses 102 on the propeller assembly urge the propeller blades forcefully toward the positive pitch. This urges fluid responsive element F rearward, increasing the pressure inside cavity 19 and causing the translation plate 33 to move slightly rearward until the valve is reopened to the position shown in FIG. 2, at which time the governor means D establishes pitch control over the propeller assembly.

However, the propeller pitch may be moved toward a selective negative pitch below 12½ degrees when not under governor control by pulling the control handle 71 downward. Such movement urges the control rod 51 forward, rotating the rotatable arm 49 in a counterclockwise direction to move the valve element 53 toward its open position. Since the pump inside the governor is constantly rotating, the pressure therefrom communicates with the fluid responsive element and urges the propeller blade toward a negative pitch. This action continues until the control rods 37 once again pull the valve element 53 forward to the valve closed position, at which time the valve element functions again as an intermediate pitch control stop means to once again establish a new selected negative pitch. The control handle 71 may be moved downward, therefore, to selected positions to establish new negative pitches until reaching a minimum negative pitch of minus 14 degrees, which has been found satisfactory for small aircraft powered by reciprocating engines.

The apparatus described thus far may utilize a throttle control which is not interconnected with the propeller pitch control system. It is advantageous that the pitch control linkage B be adapted to override the otherwise conventional throttle control linkage to programmed selected relationships between engine speed and propeller blade pitch. Such an arrangement is illustrated in FIG. 6.

A throttle override rod 105 extends between control handle 71 (see FIG. 1) and an arm 107 which is adapted to rotate freely upon the throttle butterfly control shaft 109. An alternate and the conventional throttle connecting linkage 111 extends from the cockpit to another arm 113 also adapted to rotate freely on the throttle butterfly control shaft 109. A support post 115 extends from a collar 116 and is rigidly secured to control shaft 109 at a location intermediate the arms 107, 113, having a transverse element 117 which extends laterally from either side of the support post 115 into engagement with the arms 107, 113. A suitable coil spring 119 urges the transverse element into engagement with the forward edges of the arms 106, 113. Consequently, forward movement of the conventional throttle connecting linkage 111 urges the transverse element 117 and the throttle butterfly control shaft 109 to a position to open the throttle. In addition, forward movement of control rod 105 in response to movement of pitch control handle 71 (see FIG. 1) opens the throttle in a similar manner. Thus the throttle may be opened by movement of the conventional throttle control linkage, or may be opened by downward movement of the pitch control handle 71.

When the throttle override system described in connection with FIGS. 1 and 6 is utilized, changes in the engine throttle control setting and in the propeller pitch are directly proportional because of the direct mechanical connections. If the throttle control override rod 105 and the conventional throttle connecting linkage 111 are connected with the control handle 71 as shown in FIG. 7, advantages are obtained from the resulting nonlinear relationship between throttle settings and propeller pitch. The throttle control override rod 105 in FIG. 7 has its extremity 121 in the from of a cam follower urged by a compression spring 123 against the leading surface 122 of the control rod. A selected amount of counterclockwise rotation of the modified form of pitch control handle 71 seen in FIG. 7 moves the throttle control override rod 105 a distance $x$ at which time its cam follower 121 leaves leading surface 122 and engages a curved lower surface 125 communicating therewith. Continued rotation of the control rod 45 does not affect the position of the cam 121, due to the configuration of curved surface 125, until the finger 127 which protrudes downward from curved surfaces 125 is engaged. Hence, downward movement of the control handle 71 may be used to open the throttle a selected number of degrees. Further movement of the control handle does not affect the throttle setting until engagement of the cam follower 121 with the finger 127.

The pitch control linkage previously described is adjusted such that downward movement through the angle alpha (see FIG. 1) decreases propeller pitch from positive 12½ degrees to positive 10 degrees, for example, at which time the throttle is opened a selected amount (to 20 percent power for example in the Wren 460) by utilizing the apparatus of FIG. 7. Further downward movement of the control handle 71 through angle beta reverses propeller pitch from positive 10 degrees to negative 5 degrees, for example, during which interval the throttle setting remains essentially constant because of the engagement of the cam follower 121 with the curved surface 125.

Additional downward movement of the pitch control handle 71 through the angle theta reduces the propeller pitch from negative 5 to negative 14 degrees, for example, during which interval the throttle is opened an additional amount by engagement of the cam follower 121 with the finger 127. As will become apparent in the operational description the utilization of this throttle control override system simplifies operation of the pitch control system by eliminating need for constant attention to the conventional throttle control handle.

Another suitable form of throttle override control linkage is illustrated in FIG. 10 in which a control rod 129 extends from the arm 107 of FIG. 6 to the rotatable arm 49. Preferably, control rod 129 is secured to rotatable arm 49 at a location opposite the follower 47. Movements of the follower during changes in the pitch of the propeller blade changes the position of the control rod 129 and the position of the arm 107. Consequently, changes in throttle settings are automatically made upon varying the propeller pitch control handle 71. In this embodiment changes in throttle settings and in the propeller pitch are directly proportional, there being no non-linear programming means of the type shown in FIG. 7. Such nonlinear programming means may be provided, however, by utilization of a lost motion mechanism of suitable form such as the slotted attachment plate 130 in combination with the control rod 129 as shown in FIG. 10–B. Control rod 105 extends to the cam of FIG. 7 to also enable throttle variations with control handle 71.

The control handle 71 extends from a slotted housing 131 secured to the control panel inside the cockpit. The slot 133 has an upper portion $a$ and a lower portion $b$ offset therefrom. Thus, downward movement of the handle causes it to ultimately engage the shoulder 136. Farther downward movement can be achieved only by urging the handle to the left as viewed in FIG. 8 until it reaches lower slotted portion $b$. The shoulder 136 may be selectively positioned by use of a movable plate 138.

Figure 12:
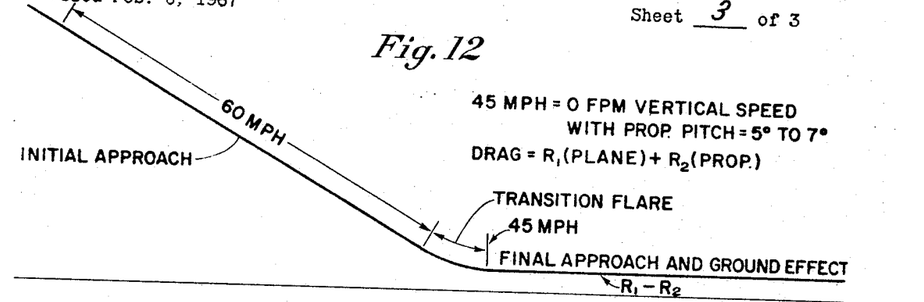
FIG. 12 depicts a typical initial landing approach, flare out, and final approach when utilizing my improved reversible pitch propeller control system while varying the pitch in the intermediate reference pitch range subsequently disclosed.

I have found it advantageous that this shoulder or reference pitch be positioned such that the slot $a$ enables pitch variation from the intermediate pitch stop to a minimum of zero degrees, with positive four degrees being the minimum on most aircraft, with a preferred range of positive 5 through 7 degrees. I refer to the range of slot $a$ as being the intermediate reference range. Such variations of pitch enable convenient use of my newly discovered landing method and prevent excessive and dangerous rates of descent. In one installation a propeller pitch of from positive five to seven degrees at air speeds of from 55 to 70 miles per hour produces a rate of descent of from 800 to 1000 feet per minute, which is about the maximum rate of descent that may be comfortably used in a final landing approach if operated at an engine speed of about 2000 r.p.m. or above. A stabilizing propeller gyroscope effect is achieved at a minimum of substantially 1800 r.p.m. During the flare at the bottom of the approach, the positive five through seven degrees propeller pitch at the above r.p.m. is used to give the craft forward thrust instead of drag. Notice in FIG. 12 that an approach of 60 miles per hour is being utilized. The total drag during approach is a function of the airframe drag plus the propeller drag as follows:

$$Drag_T = R_{1(Plane)} + R_{2(Prop)}$$

Figures 13, 15:
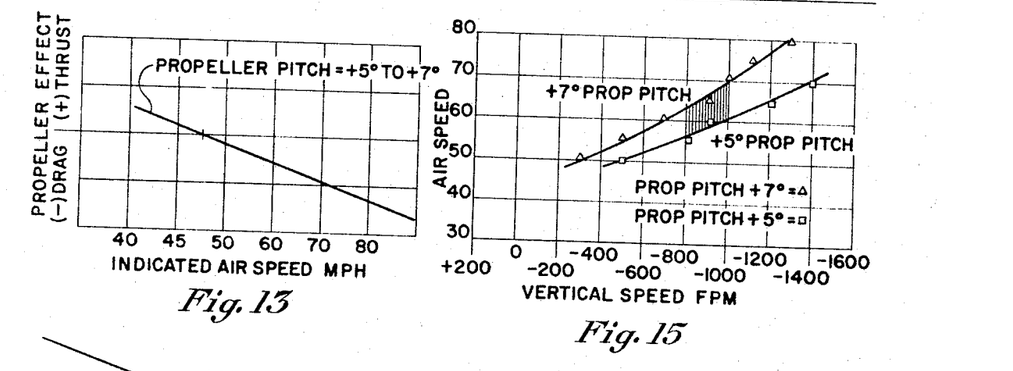
FIG. 13 graphically illustrates the relationship between air speed and propeller thrust or drag.
FIG. 15 is a graph in which indicated air speed is plotted against vertical speed at two slightly positive propeller pitches.

The propeller pitch and therefore drag is varied to maintain a selected path of descent. During the transition flare, the speed of the aircraft is reduced due to the decreased rate of descent. If the speed is reduced sufficiently the drag of the propeller decreases until finally thrust replaces drag. Consequently, the propeller helps maintain the forward speed of the aircraft and provides a smoother landing. In FIG. 13 thrust and drag are plotted against indicated air speed to show that the propeller drag changes to thrust at about 47½ miles per hour if the propeller pitch is positive 5 through 7 degrees. The data disclosed herein and the results depicted in the various graphs were obtained with test flights in a "Wren" 460, which has a 230 horsepower "Continental" 0470 engine utilizing an 82 inch diameter "Hartzell" propeller HC-AX2VF.

Figure 14:
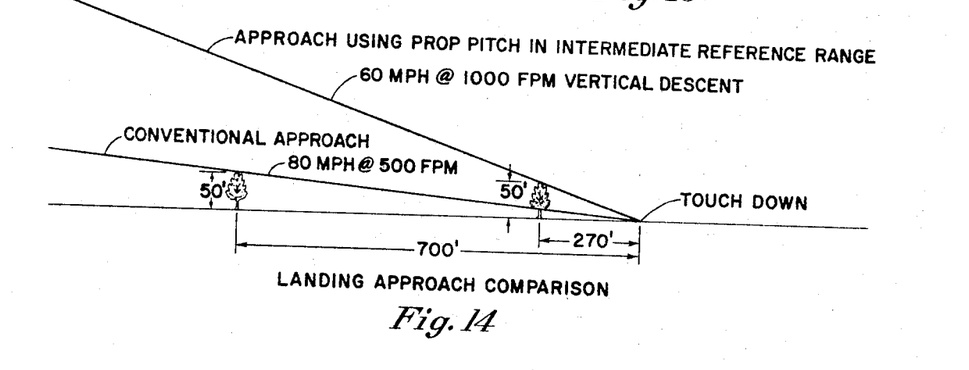
FIG. 14 contrasts approaches made with aircraft having my improved system with conventional aircraft having nonreversible pitch propellers.

The graph of FIG. 15 is included to show test results when utilizing my control system in which indicated air speed in miles per hour is plotted against vertical descent speed in feet per minute. The upper curve shows variations in indicated air speed and vertical speed with the propeller pitch at positive 7 degrees. The lower curve indicates results with the propeller pitch at positive 5 degrees. In obtaining the data for these curves the propeller was rotating at about 2200 r.p.m. while utilizing 20 percent of the available horsepower. The best results are obtained in the Wren 460 with the air speed in a range from about 55 to 70 miles per hour and with a pitch varying from positive 5 to positive 7 degrees which gives a vertical descent speed from 800 to 1000 feet per minute. Descent speeds in excess of about 1000 feet per minute are too fast for the final stages of an approach, since it becomes difficult to achieve an effective transition flare. The advantages of approaching the runway at 60 miles per hour while varying the propeller pitch to achieve a vertical descent speed of 1000 feet per minute with a conventional approach of 80 miles per hour at a descent speed of 500 feet per minute is shown in FIG. 14. The added safety is apparent since the chances for clearing obstacles at the end of the runway are much better and pilot error becomes less likely to produce an accident.

Depending upon the specific propeller, air frame and engine combination, test results indicate that the propeller pitch should be varied in an intermediate reference pitch range that varies from zero to the normal low pitch stop to comparable nonreversible propeller. With the Wren 460 the range is ideally from 5 through 7 degrees as explained above, at about 20 percent of the available power.

In the above apparatus it is impossible to move the propeller pitch to negative during the approach if the propeller is operating at governed speed. For at governed speed the piston 82 (see FIG. 5) of the governor is moved to a position to lock the propeller blade in whatever position it is in when governed speed is reached. Thus, if the propeller pitch has been established at positive 4 degrees and the propeller reaches governed speed during the approach, it is first necessary to throttle back the engine to something less than governed speed before the pitch can be moved toward negative.

Figure 11:
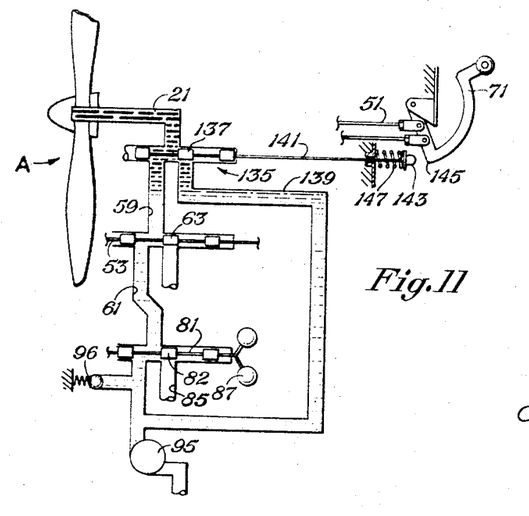
FIG. 11 is a schematic view of governor by-pass means.

To overcome this deficiency in the system I provide apparatus as shown in FIG. 11. In this apparatus the system is provided with a governor override valve 135. This valve has a piston 137 interposed in a passageway 139 extending from a location intermediate the governor pump and the small diameter mandrel 81 and piston 82 of the governor. The position of piston 137 is controlled by linkage 141 which extends into the cockpit for manual control.

When the piston 82 inside the governor is positioned to block the flow of fluid into or from the passage 85, thus locking the propeller in its previously existing pitch (as when making an approach with the propeller operating at governed speed), the linkage 141 is moved such that piston 137 is urged forward to enable fluid to flow from the governor pump through passage 139 into the fluid responsive element F of the propeller assembly. This then enables the governor to be overridden by the valve 135 to enable the pitch to be reversed even though the engine is operating at engine speed.

Linkage 141 preferably has a cam follower 143 which engages a cam surface 145 formed on the lower extremity of the control handle 71. When engaged by the cam surface 145, the linkage 141 is urged against the force of spring 147, which normally holds piston 137 in the open position. The spacing between cam surface 145 and cam follower 143 is selected to correspond with a negative pitch of minus five degrss, for example, because its utilization arises at the bottom of the approach near the desired point of touch down to achieve a rapid final reverse when desired. This modification nevertheless will not enable interference with governor control when operating at governed speeds and in the above described positive pitch range since as previously explained the valve element 53 is positioned rearwardly as shown in FIG. 2 when operating at governed speeds. Attempted downward movement of control handle 71 is thus prevented, as is forward movement of linkage 141 associated with the governor override valve 135. Upward movement of handle 71 is prevented since its uppermost position is established when governor control arises. Consequently, the governor by-pass improvement may be used only in a safe and reliable manner.

In operation the above described system is utilized to enable reversing of the propeller pitch toward negative values in an effective and safe manner. The operation of the system will be described in stages commonly encountered such as during takeoff, flight, landing, etc. When the aircraft is on the ground and the engine stopped, for example, the pump 95 of governor means D is inactive and thus the internal spring 44 in the propeller assembly A urges the propeller blades to their maximum positive pitch. The valve element 53 of valve C is pushed rearward to the position shown in FIG. 1. Upon starting the engine the valve element 53 remains in the position shown in FIG. 1 so long as the control handle 71 is in its uppermost position, and thus the fluid from the engine oil reservoir E is pumped through the valve into the fluid chamber 19 behind the fluid responsive element F.

The resulting increased pressure in the fluid chamber 19 urges the fluid responsive element F outward, moving the pivot arms 25 such that the propeller blades 11 are urged toward the intermediate positive pitch stop. As explained previously, the maximum pitch of the propeller blades may be approximately 20 degrees, but the stop nuts 41 on the control rods 37 do not engage the receiving collars 39 of the fluid responsive element F until the propeller pitch is decreased to about 12½ degrees. This provides approximately 7½ degrees play through which the propeller blade pitch may vary when under governor control such as when in flight. But with the propeller turning at idling speeds and hence when not under governor control, the fluid pressure inside fluid chamber 19 urges the fluid responsive element to a position such that the control rods pull the translation plate forward (or to the left as viewed in FIG. 2), thus pulling the follower 47 and the valve element 53 to the "valve closed" position shown in FIG. 3.

As thus positioned, fluid cannot flow into or from the cavity 19 behind fluid responsive element F, causing the propeller pitch to remain locked in this position until additional power is applied to urge the propeller blades toward a more positive pitch in response to the action of the centrifugal weights 102 or until the propeller pitch control handle 71 is moved downward intentionally to selectively decrease the propeller pitch to values below 12½ degrees. Therefore, the system operates in a manner to provide an intermediate pitch control stop means that defines with the maximum positive pitch a selected positive pitch range through which the propeller blades may vary in response to control by the governor means D in maintaining the desired propeller loading and speed.

When preparing for takeoff, power is applied to increase the propeller speed which causes additional centrifugal forces to be exerted upon the centrifugal masses 102 (see FIG. 1) of the propeller assembly, moving the propeller blades toward their maximum positive pitch. Moreover, the force exerted by the internal spring 44 on the fluid responsive element F urges it inward toward the maximum positive pitch. The action of the compression spring 43 urges the control rods 37 rearward, forcing the translation plate 33, the follower 47, and the valve element 53 rearward to the "valve open" position shown in FIG. 2. Hence, the governor means D freely pumps fluid between the engine oil reserve E and the fluid responsive element F to establish governor control of the propeller blade pitch.

So long as the propeller blade pitch varies only between the maximum positive pitch and the intermediate positive pitch stop, the manual propeller pitch reversing linkage may not be used to alter the propeller pitch. The control linkage utilizes a mechanical stop and is adjusted such that the control handle 71 is in its uppermost position shown in FIG. 1 when operating at governed speeds. This rigidly establishes the intermediate pitch stop at a definite selected location which can be altered only by readjusting the linkage adjustment means 72. If the control handle 71 is moved downward in an attempt to manually reverse the propeller blade pitch while the propeller is operating at governed speeds and thus between 12½ and 20 degree pitches, for example, the result will be an attempt to rotate the rotatable arm 49 counterclockwise as viewed in FIG. 2 and to move the valve element 53 rearward. But since the valve element is already in the "valve open" position due to its previous automatic rearward movement, further rearward movement cannot be achieved. Consequently, the propeller blade pitch cannot be manually reversed while the propeller blades are operating at governed speeds.

Nor can the propeller blade pitch be manually moved toward the maximum positive pitch since the control linkage is adjusted such that when in its uppermost position the control handle 71 may be not be moved upward any farther. Hence, the valve element may not be moved toward the "dump position" illustrated in FIG. 4 which would have the effect of relieving all fluid pressure inside the fluid chamber 19 to enable the centrifugal weights 102 and internal spring 44 to move the propeller blades to the maximum positive pitch.

When preparing to descend, engine speed is decreased and the governor pump 95 (by continuing to pump oil into the fluid chamber 19) moves the propeller blades toward the intermediate positive pitch stop, at which time the valve element 53 once again returns to the "valve closed" position shown in FIG. 2. To manually reverse the propeller blades, the control handle 71 may be moved downward a selected amount, causing counterclockwise rotation of rotatable arm 49 and rearward movement of valve element 53 until it assumes the "valve open" position shown in FIG. 2. Once again fluid is urged by the governor pump 95 into the fluid chamber 19, moving the propeller blades toward a negative pitch as previously explained. The new selected propeller pitch is fixed when the fluid responsive element F pulls the control rods 37, the translation plate 33, and the valve element 53 forward until the "valve closed" position shown in FIG. 3 is reached. Thus, any desired propeller pitch setting may be established depending upon the extend of the downward movement of the control handle 71.

The control handle 71 may be used to move tthe propeller blades to a minimum pitch of negative 14 degrees, for example, but to facilitate landing, the above described reference stop (see FIG. 8) is provided on the control console so that the propeller pitch may be conveniently varied only through the selected intermediate pitch control stop of 12½ degrees to positive 4 degrees in the Wren 460. As previously explained, I have discovered that a surprisingly effective landing is achieved if a low positive pitch is used to change propeller drag to thrust during the transition flare.

When the plane reaches the runway, the propeller blade pitch may be reversed to the maximum negative pitch to rapidly decrease aircraft ground speed and ground roll by moving the control handle 71 toward the left and the slotted portion b (see FIG. 8). This can be accomplished by using the governor override of FIG. 11 even when the propeller is turning at governed speed. The throttle control override linkages described above are utilized to maintain engine speed within selected ranges during propeller blade pitch reversing operations. The embodiment described in connection with FIG. 7 is particularly effective in this regard. During the approach to the runway, downward movement of the control handle 71 to vary the propeller pitch in the intermediate reference pitch range of 12½ to 4 degrees, for example, open the throttle an amount that gives a convenient degree of throttle control and correlation with selected propeller blade pitches. However, the throttle setting remains constant over a selected range of propeller blade pitch reversal since I have found that engine speeds need not be increased during an intermediate range of propeller pitches. And yet the apparatus automatically increases engine speed once again when the propeller blade pitch approaches the minimum negative pitch so that rapid braking may be automatically effected. Such interrelations between throttle settings and propeller pitch are especially helpful to relatively inexperienced pilots but are welcomed by all.

It should be apparent from the foregoing that I have provided an invention having significant advantages. By utilizing my control system in the above described manner the propeller pitch may be manually varied only during those instances when manual propeller pitch variations can be safely made. Manual propeller pitch variations may be effected only so long as the propeller pitch is outside a selected positive pitch range. So long as the propeller pitch is in the selected positive pitch range the control handle of the system is inactivated, effectively preventing tbe pilot from manually moving the propeller pitch toward either positive or negative.

In addition, I have utilized apparatus that establishes a minimum reference pitch and an intermediate reference range through which the propeller pitch may be varied during landing approaches to produce extremely safe and satisfactory landings. In using this method and apparatus the pilot may safely steer the aircraft in a vertical plane to accurately touch down on a predetermined spot. Also propeller blade drag changes to thrust during the transition flare to achieve a surprisingly smooth landing. To simplify the use of my control system the throttle override linkages described above automatically correlate propeller pitch settings with throttle settings to eliminate the necessity for operating separate control levers. Preferably, the pitch control handle and the throttle setting control lever have a programmed nonlinear relationship so that propeller speed and pitch settings are correlated in a manner to achieve optimum results. Specifically, the throttle is opened a selected amount during the initial lowering of the control handle through an initial angle alpha. Through the next angle beta of control handle movement the throttle setting remains substantially constant. But the throttle is opened an additional amount while the control handle is moved through a final angle theta. Hence, the pilot may touch down at the exact selected spot by varying only the control handle 71.

The provision of a governor by-pass system which is operational only so long as the propeller pitch is below the selected upper positive pitch range enables the pilot to rapidly move the propeller blade pitch toward its maximum value even when the propeller is rotating at governed speed. This improvement when combined with other safety features of my control system enables more effective control over the aircraft by eliminating a necessity for decreasing engine speed below governed speed during the landing approach.

While I have shown my system in only a few of its forms it should be apparent to those skilled in the art that it is not so limited but is susceptible to various changes and modifications without departing from the spirit thereof. It should be apparent for example that my invention may be applied to nonhydraulic systems. In such instances the control valve C would have an equivalent referred to as a control element which establishes the intermediate positive pitch automatically by means of a connector element (the control rods 37, receiving collars 39, nuts 41, and translation plate 33 in the illustrated preferred embodiment) that responds to pitch variations. In such instances means for preventing interference wtih governor control equivalent to the mechanical linkage described above would be utilized in the interest of safety. Expressed another way, the control element would be inoperative while the propeller blade pitch is in the upper positive pitch range. The other components of the system could be similarly varied from those of the hydraulic systems, for in its broadest aspects my invention is not limited to specific components but encompasses also those which accomplish substantially the same result in substantially the same manner.

I claim:

1. In a reversible propeller pitch control system of the type having a governor and pump means D for selectively urging a fluid responsive element F and propeller blades 11 toward negative positions, said system including a reciprocable translation plate 33 and follower 47 that are inactive in an upper pitch range but urged forward when the pitch falls below a selected intermediate pitch, said system further including a three position pitch control valve C located in the passage 21, 59, 61 between the governor and pump means D and the fluid responsive element, the improvement comprising:

a rotatable arm 49 having a mid-region secured to said follower;
a lower region of the arm secured to the forward end of the pitch control valve, which has a forward-open position, a middle-blocked position, and a rearward-dump position;
a control rod 51 secured to an upper region of the arm;
a stationary mechanical stop 74 adjusted to engage a mating shoulder 76 on the control rod at the selected intermediate pitch when the valve is in its forward-open position.

2. The system defined by claim 1 which further comprises a governor override valve 135 having an open position and a dump position and being interposed in the passage between the governor and pump means and the fluid responsive element; biasing means connected with the governor override value to urge it toward the open position; a control linkage 141 connected with the governor override valve; a cam follower 143 connected with the control linkage; a cam surface 45 connected with said control rod 51 and engaging the cam follower 143 when said rod is moved below a selected intermediate propeller pitch.

3. The system defined by claim 2 in which said governnor override valve is disposed between the three position pitch control valve and the fluid responsive element F.

4. In a reversible propeller pitch control system of the type having a governor and pump means D for selectively urging a fluid responsive element F and propeller blades 11 toward negative positions, said system including a reciprocable translation plate 33 and follower 47 that are inactive in an upper pitch range but urged forward when the pitch falls below a selected intermediate pitch, said system further including a three position pitch control valve C located in the passage 21, 59, 61 between the governor and pump means D and the fluid responsive element, the improvement comprising:

a rotatable arm 49 having a mid-region secured to said follower;
one end region of the arm secured to the pitch control valve, which has an open position, a blocked position and a dump position;
a control rod secured to the opposite end of the arm;
a stationary mechanical stop adjusted to engage a mating shoulder on the control rod at the selected intermediate pitch when the valve is in its open position.

5. The system defined by claim 4 which further comprises a governor override valve 135 having an open position and a dump position and being interposed in the passage between the governor and pump means and the fluid responsive element; biasing means connected with the governor override valve to urge it toward the open position; a control linkage 141 connected with the governor override valve; a cam follower 143 connected with the control linkage; a cam surface 45 connected with said control rod 51 and engaging the cam follower 143 when said rod is moved below a selected intermediate propeller pitch.

6. The system defined by claim 5 in which said governor override valve is disposed between the three position pitch control valve and the fluid responsive element F.

7. In a reversible propeller pitch control system of the type having a governor and pump means D for selectively urging a fluid responsive element F and propeller blades 11 toward negative positions, said system including a reciprocable translation plate 33 and follower 47 that are inactive in an upper pitch range but urged forward when the pitch falls below a selected intermediate pitch, said system further including a three position pitch control valve C located in the passage 21, 59, 61 between the governor and pump means D and the fluid responsive element, the improvement comprising:

a rotatable arm having one region pivotally secured to said follower;
another region of the arm secured to the pitch control valve, which has an open position, a blocked position and a dump position;
a control rod secured to a selected region of the arm;
a stationary mechanical stop adjusted to engage a mating shoulder on the control rod at the selected intermediate pitch when the valve is in its open position.

8. The system defined by claim 7 which further comprises a governor override valve 135 having an open position and a dump position and being interposed in the passage between the governor and pump means and the fluid responsive element; biasing means connected with the governor override valve to urge it toward the open position; a control linkage 141 connected with the governor override valve; a cam follower 143 connected with the control linkage; a cam surface 45 connected with said control rod 51 and engaging the cam follower 143 when said rod is moved below a selected intermediate propeller pitch.

9. The system defined by claim 8 in which said governor override valve is disposed between the three position pitch control valve and the fluid responsive element F.

10. In a reversible propeller pitch control system of the type having a governor and pump means D for selectively urging a fluid responsive element F and propeller blades 11 toward negative positions, said system including a reciprocable translation plate 33 and follower 47 that are inactive in an upper pitch range but urged forward when the pitch falls below a selected intermediate pitch, said system further including a three position pitch control valve C located in the passage 21, 59, 61 between the governor and pump means D and the fluid responsive element, the improvement comprising:

a rotatable arm 49 having a mid-region secured to said follower;
a lower region of the arm secured to the forward end of the pitch control valve, which has a forward-open position, a middle-blocked position, and a rearward-dump position;
a control rod 51 secured to an upper region of the arm;
a stationary mechanical stop 74 adjusted to engage a mating shoulder 76 on the control rod at the selected intermediate pitch when the valve is in its forward-open position;
a control handle 71 pivotally secured to the control rod 51;
a control console through which the control handle extends, said console having a reference pitch stop at a minimum of zero degrees.

11. The system defined by claim 10 wherein the reference pitch stop is established at a minimum of four degrees.

12. In a reversible propeller pitch control system to the type having a governor and pump means D for selectively urging a fluid responsive element F and propeller blades 11 toward negative positions, said system including a reciprocable translation plate 33 and follower 47 that are inactive in an upper pitch range but urged forward when the pitch falls below a selected intermediate pitch, said system further including a three position pitch control valve C located in the passage 21, 59, 61 between the governor and pump means D and the fluid responsive element, the improvement comprising:

a rotatable arm 49 having a mid-region secured to said follower;
one end region of the arm secured to the pitch control valve, which has an open position, a blocked position and a dump position;
a control rod secured to the opposite end of the arm;
a stationary mechanical stop adjusted to engage a mating shoulder on the control rod at the selected intermediate pitch when the valve is in its open position;
a control handle 71 pivotally secured to the control rod 51;
a control console through which the control handle extends, said console having a reference pitch stop at a minimum of zero degrees.

13. The system defined by claim 12 wherein the reference pitch stop is established at a minimum of four degrees.

14. In a reversible propeller pitch control system of the type having a governor and pump means D for selectively urging a fluid responsive element F and propeller blades 11 toward negative positions, said system including a reciprocable translation plate 33 and follower 47 that are inactive in an upper pitch range but urged forward when the pitch falls below a selected intermediate pitch, said system further including a three position pitch control valve C located in the passage 21, 59, 61 between the governor and pump means D and the fluid responsive element, the improvement comprising:

a rotatable arm having one region pivotally secured to said follower;
another region of the arm secured to the pitch control valve, which has an open position, a blocked position and a dump position;
a control rod secured to a selected region of the arm;
a stationary mechanical stop adjusted to engage a mating shoulder on the control rod at the selected intermediate pitch when the valve is in its open position.

15. The system defined by claim 14 wherein the reference pitch stop is established at a minimum of four degrees.

References Cited

UNITED STATES PATENTS

| | | | |
|---|---|---|---|
| 3,207,227 | 9/1965 | Timewell | 170—160.2 |
| 3,249,159 | 5/1966 | Biermann | 170—160.2 |
| 3,380,535 | 4/1968 | Biermann | 170—160.2 |

JULIUS E. WEST, *Primary Examiner.*

U.S. Cl. X.R.

170—135.74; 244—83